United States Patent [19]

Johnson

[11] Patent Number: 5,526,109
[45] Date of Patent: Jun. 11, 1996

[54] MULTI-VELOCITY COMPONENT LDV

[75] Inventor: Dennis A. Johnson, Los Altos, Calif.

[73] Assignee: The United States of America as represented by the Administrator of the National Aeronautics and Space Administration, Washington, D.C.

[21] Appl. No.: 727,263

[22] Filed: Jun. 27, 1991

[51] Int. Cl.⁶ .................................................. G01P 3/36
[52] U.S. Cl. .................................................. 356/28.5
[58] Field of Search ............................................ 356/28.5

[56]  References Cited

U.S. PATENT DOCUMENTS

| | | | |
|---|---|---|---|
| 3,744,910 | 7/1973 | Deelen | 356/4 |
| 4,148,585 | 4/1979 | Bargeron et al. | 356/28.5 |
| 4,284,351 | 8/1981 | Alldritt et al. | |
| 4,506,979 | 3/1985 | Rogers | 356/28.5 |
| 4,596,254 | 6/1986 | Adrian et al. | |
| 4,610,540 | 9/1986 | Mossey | |
| 4,786,168 | 11/1988 | Meyers et al. | |
| 4,818,071 | 4/1989 | Dyott | 356/28.5 |

OTHER PUBLICATIONS

W. Farmer and J. Hornkohl, "Two–Component, Self–Aligning Laser Vector Velocimeter", Applied Optics, vol. 12, No. 11 (No. 1973).

*Primary Examiner*—Stephen C. Buczinski
*Attorney, Agent, or Firm*—Kenneth L. Warsh

[57]  ABSTRACT

A laser doppler velocimeter uses frequency shifting of a laser beam to provide signal information for each velocity component. A composite electrical signal generated by a light detector is digitized and a processor produces a discrete Fourier transform based on the digitized electrical signal. The transform includes two peak frequencies corresponding to the two velocity components.

19 Claims, 4 Drawing Sheets

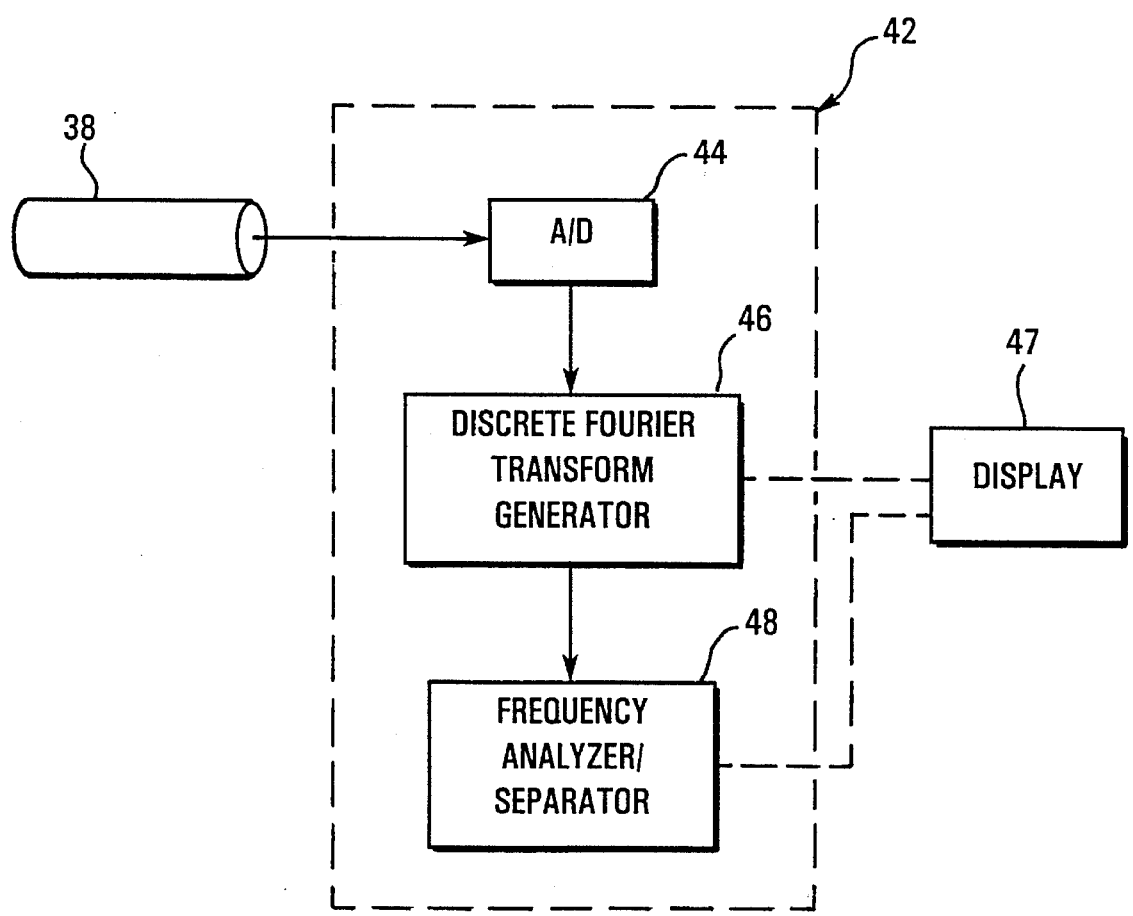

MULTI-VELOCITY COMPONENT LDV

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

The present invention relates generally to the field of laser velocimetry, and more specifically, to a laser doppler velocimeter (LDV) which uses frequency shifting and a single channel digital frequency processor to effect multi-velocity component measurements.

2. Description of the Related Art

LDVs are now in common use for flow measurements during, for example, wind tunnel testing of various structures. There are many types of known LDVs, but most operate off similar basic principles.

Dual beam LDVs use optics to split a laser beam into two beams and to focus the beams to cross at a point where measurements are to be made. Due to wave interference, a fringe pattern is formed at the beam intersection. A second lens assembly, functioning as a receiver, is focused on the fringe region to collect light scattered from seed particles crossing the fringes. The collected light is fed to a photodetector that is used as the input to an electronic signal processor that measures modulated frequency.

In a dual beam system the frequency from the scattered light from the split beams is directed onto the surface of the photodetector where it is mixed, and a difference in frequency between the two beams will result.

Flow velocity can be derived from the modulated frequency, which can be expressed as $2\mu_x \sin \beta / \gamma$
where $\mu_x$=velocity parallel to the plane of the two beams and perpendicular to a bisector of the beams;

$\beta$=angle between one of the beams and the bisector, and $\gamma$=wavelength of the laser light.

An example of a signal processor for a LDV is described in U.S. Pat. No. 4,786,168, issued to Meyers et al. on Nov. 22, 1988. A processor is described therein for measuring the signal frequency within a signal burst. A photodetector converts an optical signal, composed of scattered light emanating from the fringe pattern, into an electronic signal. The electronic signal is composed of a collection of Poisson distributed photo-electrons whose average occurrence rate is proportional to the instantaneous light intensity at the photocathode. As the intensity increases from the photon resolved regime, the additional photon arrivals within the response time add voltage to the output signal. Eventually, the signal approaches a Gaussian-shaped signal burst containing the oscillation frequency. The frequency is multiplied by the distance between adjacent fringes to yield the velocity of the particle.

The aforementioned processor of Meyers et al. converts the input signal to digital and shifts it into shift registers. A signal integration circuit determines when a signal burst has been captured by the shift registers and transfers the contents to data latches, whereupon the data is processed by bandpass filters, square law detectors, burst counters and a signal processor to determine the frequency of the signal.

W. Farmer and J. Hornkohl describe a LDV which measures two-vector components of velocity in an article entitled "Two-Component, Self-Aligning Laser Vector Velocimeter", *Applied Optics*, vol. 12, no. 11 (Nov. 1973). The LDV, schematically illustrated in FIG. 1, includes a laser 10 outputting a beam to a two-dimensional Bragg cell 12. The Bragg cell 12 is actually two Bragg cells in a common housing arranged so that the center lines of the cells are coincident and orthogonal. This arrangement allows the Bragg cell 12 to be both a beam splitter and a frequency shifter. The crystal oscillators of the Bragg cell 12 are driven at two different frequencies for detection separation of the respective velocity components.

The Bragg cell 12 produces four output beams, three of which are diffracted beams and the fourth is the original input beam. The diffracted beams can be independently shifted up or down in frequency. The beams are focused by a lens 14 to cross simultaneously at a point. Scattered light is collected by a lens system 16 and focused on a photomultiplier 18 and the output signal therefrom is processed by signal processors 20 (only one shown) which use band-pass filters 21 to separate the carrier frequencies for the respective velocity components.

Other methods of obtaining simultaneous multi-velocity component LDV measurements involve, instead of frequency shifting, the use of a different laser wavelength for each velocity component. Generally, multiple photodetectors and signal processors are used with narrow-band light filters placed ahead of the photodetectors. The use of multiple processors, either counter-type or digital frequency-type in LDV measurements, with one provided for each velocity component, is fairly common.

It is generally accepted in the laser doppler velocimeter field that a separate signal processor channel is needed for each velocity component signal under sparse seeding conditions. High speed digital counters facilitate this procedure by measuring the time between zero crossings of signals produced from individual particles passing through the LDV sensing volume. However, the requirement for multiple processing channels and photo-detectors makes the overall set up of an LDV using different wavelength (color) lasers complicated and expensive.

SUMMARY OF THE INVENTION

An object of the present invention is to provide a LDV which requires only a single channel signal processor for either two and three-velocity component measurements.

Another object of the present invention is to provide a LDV which requires fewer optical components, as compared to LDVs using multiple laser wavelengths, and thus provides a cost saving without sacrificing quality of measurements.

Another object of the present invention is to provide a LDV capable of producing accurate measurements even with low seed particle concentrations.

These and other objects are met by providing a laser doppler velocimeter for measuring multi-velocity component flow of a fluid having seed particles dispersed therein, including a laser outputting a beam, a modulator receiving the laser beam and outputting at least two frequency modulated diffracted beams and a primary beam, each of the at least two diffracted beams corresponding to a velocity component and having a different frequency, a transmitting lens receiving and converging the at least two frequency modulated diffracted beams and the primary beam to cross at a cross-over region, a collection lens positioned to collect particle-scattered light from the cross-over region, said collection lens focusing collected particle-scattered light into a multi-mode fiber, a light detector connected to the multi-mode fiber and producing a composite electrical signal containing information about each velocity component, an analog to digital converter for digitizing the composite electrical signal, and a processor for producing a discrete Fourier transform based on the digitized electrical signal, and including a peak frequency corresponding to each velocity component.

These and other features and advantages of the laser doppler velocimeter and method will become more apparent with reference to the following detailed description and drawings.

BRIEF DESCRIPTION OF THE DRAWINGS

FIG. 7 is a schematic view of the signal processor of the present invention.

DETAILED DESCRIPTION OF THE PREFERRED EMBODIMENTS

Figure 1:
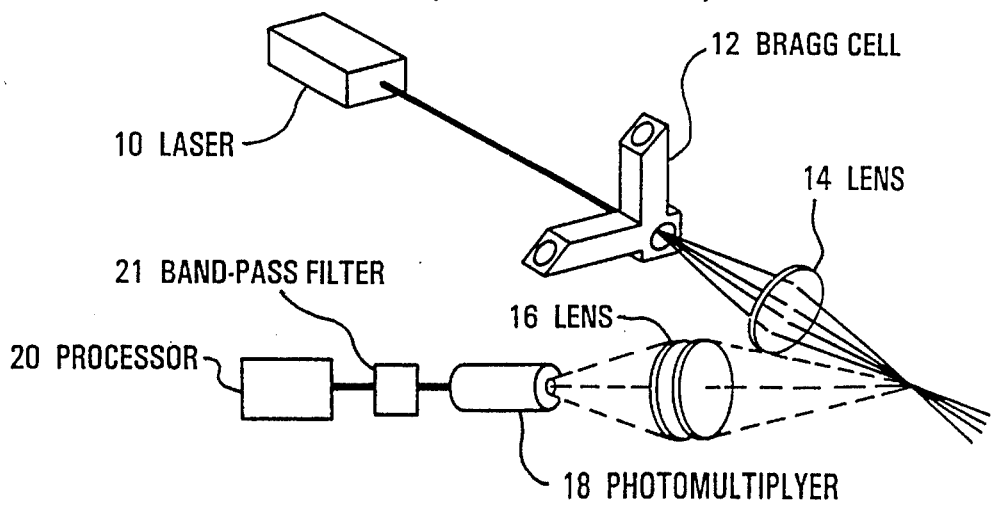
FIG. 1 is a perspective view of a known two-velocity component LDV using a Bragg cell.
Figure 2:
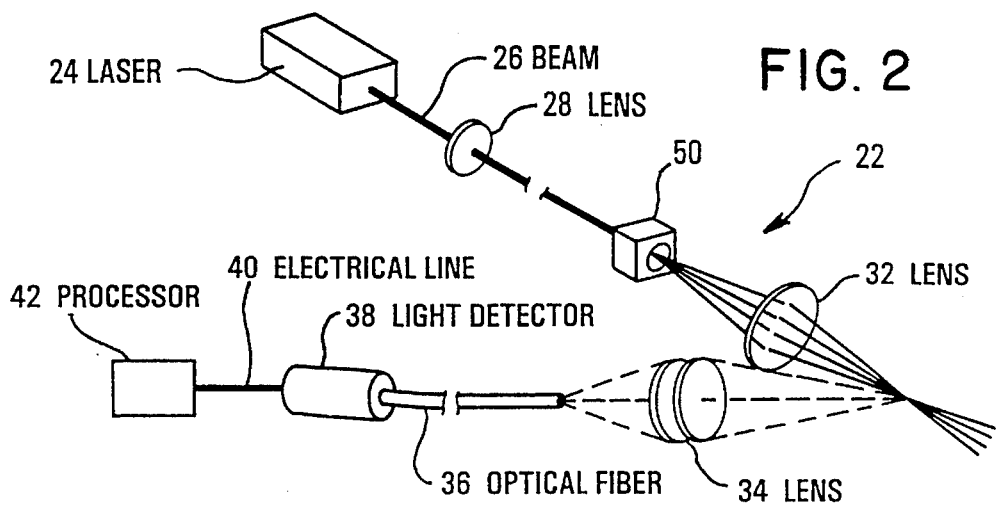
FIG. 2 is a perspective view of a LDV according to the present invention.

Referring to FIG. 2, a LDV according to the present invention is generally referred to by the numeral 22 and includes a laser 24 outputting a beam 26 which passes through a beam waist positioner lens 28 and continues to a two dimensional acousto-optic modulator 30, which could be a Bragg cell such as the one described with respect to FIG. 1.

The modulator 30 outputs a primary beam and at least two diffracted laser beams, all of which define multiple orthogonal planes. The beams are then passed through a transmitting lens 32 which causes the beams to cross or intersect at a common point, thus defining a cross-over region.

As a result of the beam waist positioner lens 28, the waist of each of the laser beams is at the common point. This ensures minimum variation in fringe spacing in the cross-over region.

A collecting lens 34 or combination of lenses is positioned to collect particle-scattered light from the laser beam crossover region. The lens 34 focuses the scattered light into one end of a multi-mode optical fiber 36, which transmits the light to a light detector 38. The detector 38 outputs via line 40 an electrical signal that contains several different frequencies from which multi-velocity component information can be extracted with a digital frequency processor 42 (to be described in more detail below).

Figure 3:
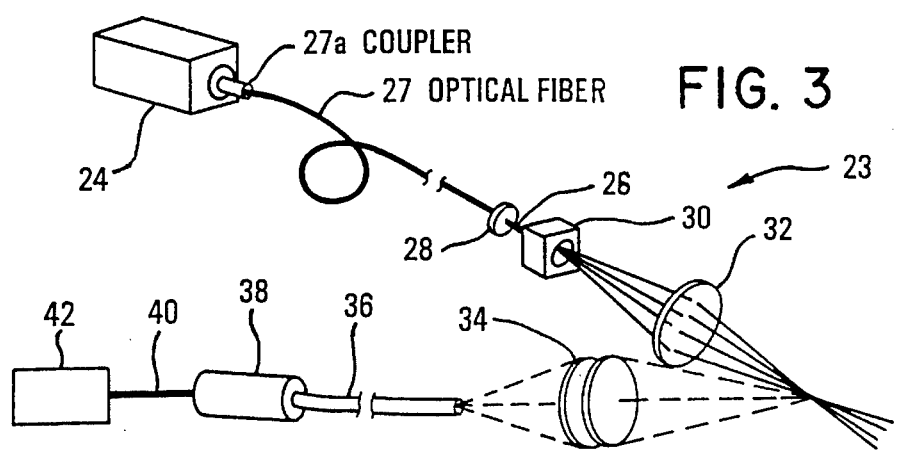
FIG. 3 is a perspective view of a LDV according to a second embodiment of the present invention.

Referring to FIG. 3, another embodiment of a LDV according to the present invention is generally referred to by the numeral 23 and it includes all of the same elements of the embodiment of the LDV 22 of FIG. 2, except that a single-mode optical fiber 27 is disposed between the laser 24 and the modulator 30. This embodiment is more portable than that of the embodiment of FIG. 2, and requires the addition of a fiber-optic coupler 27a. The coupler 27a permits much of the laser beam energy to enter the optical fiber 27 at one end, while the beam waist positioner lens 28 is disposed at the other end. The lens 28 functions the same in both embodiments.

One of the features of the present invention is that there only needs to be one single-mode optical fiber 27. In most dual-color two-velocity component LDV systems, four single-mode fibers would be required, each having its own coupler. Couplers such as coupler 27a of FIG. 3 are expensive and adjustments thereof are time consuming. Moreover, with multiple fibers, measurement errors can result because of variations in optical path lengths of the individual fibers, which can vary independently with time as a result of either mechanical stressing or non-uniform temperature exposure. Thus, the use of a single fiber avoids the aforementioned potential sources of measurement error.

Figure 4:
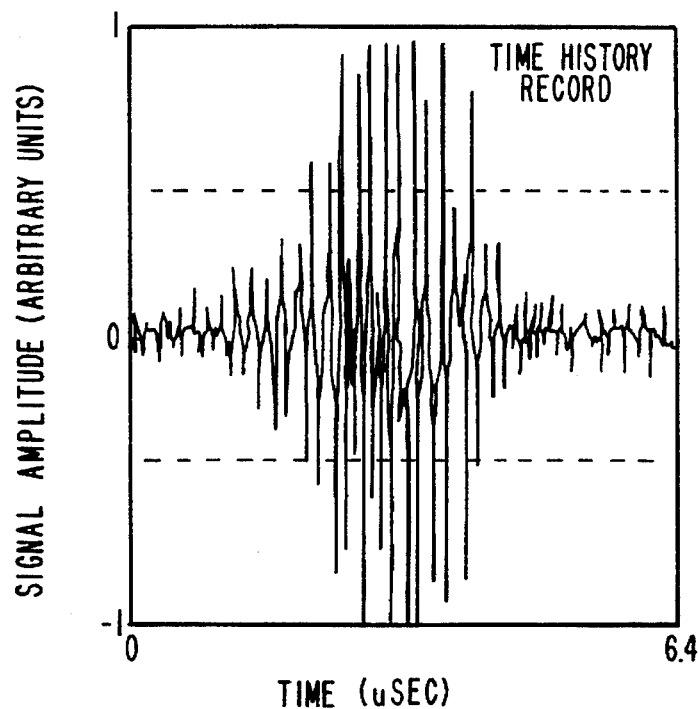
FIG. 4 is a time chart reproduction of a typical electrical signal produced by the light detector of either embodiment of FIGS. 2 and 3.
Figure 5:
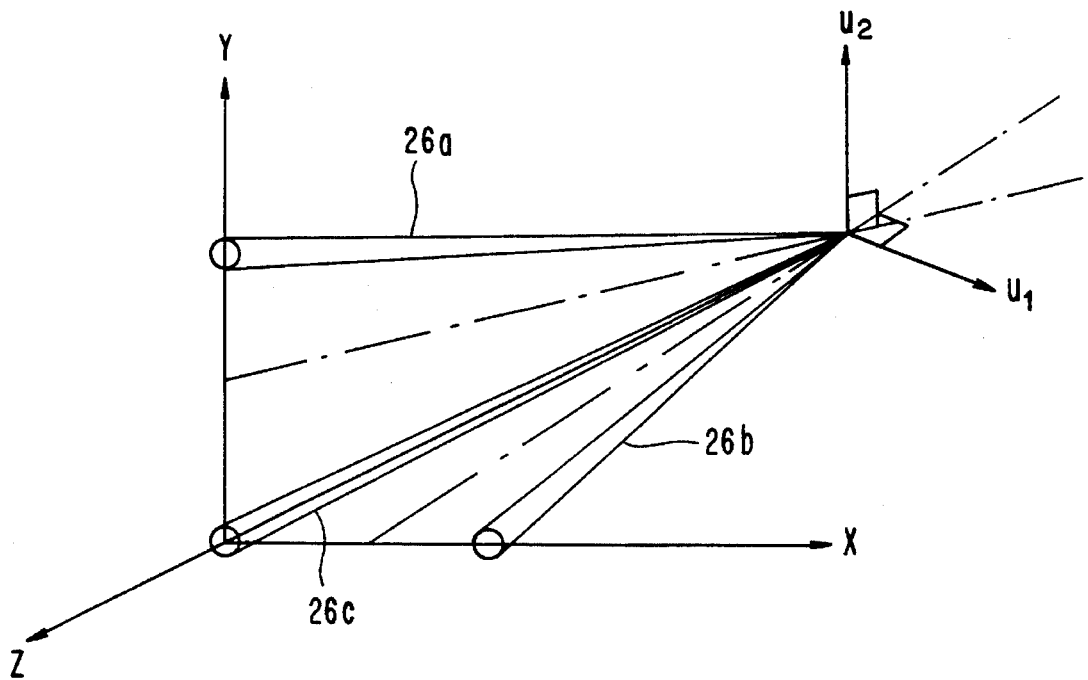
FIG. 5 is a schematic, perspective view illustrating a laser beam arrangement capable of producing the electrical signal illustrated in FIG. 4.

To explain the signal processing according to the present invention, a representative electrical signal produced by the light detector 38 (for either embodiment) is illustrated in FIG. 4. The signal, produced when a sub-micron size particle passes through the crossing laser beams illustrated in both FIGS. 2 and 3, contains information on two velocity components and results from the laser beams being frequency shifted by the modulator 30. The signal illustrated in FIG. 4 could be produced by a laser beam arrangement illustrated in FIG. 5. Three laser beams 26a, 26b and 26c are produced by driving the two-dimensional acousto-optic modulator 30 at two different frequencies fo(1) and fo(2) and then blocking all but the primary beam 26c and two Bragg diffracted beams 26a and 26b.

The velocity components sensed, u1 and u2 are substantially orthogonal, and each lies in the plane of a primary/diffracted laser beam pair and perpendicular to corresponding bisectors b1 and b2 defined by each laser pair (26a, 26c) and (26c, 26b), respectively. A third velocity component is sensed by the two diffracted laser beams 26a and 26b, and lies in the plane defined by the velocity components u1 and u2 and is thus not linearly independent of u1 and u2.

The frequency offset for this diagonal pair is either fo(1)+of(2) or fo(1)−fo(2). The part of the signal due to this laser pair, which provides no additional velocity information, can easily be removed by electronic filtering and was done so for the signal in FIG. 4.

Measurement of a third independent velocity component could be accomplished by unblocking a third diffracted beam emanating from the acousto-optic modulator so that four laser beams instead of three intersect at the common point.

Figure 6A:
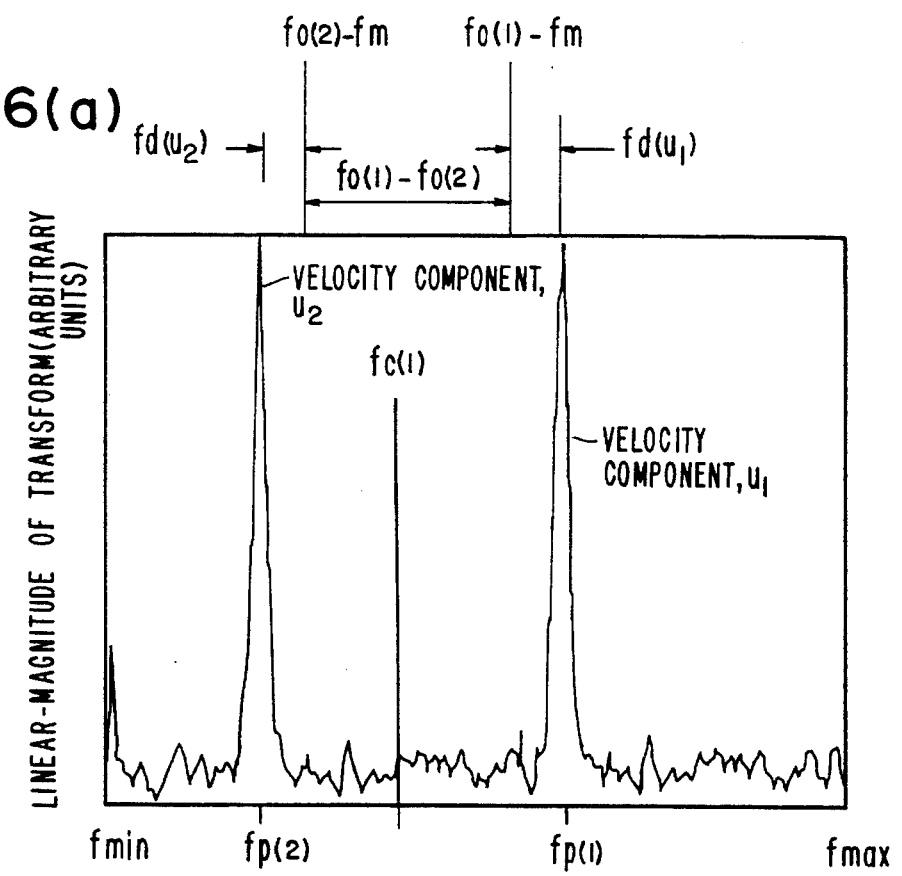
FIG. 6(a) is a discrete Fourier transform of the electrical signal of FIG. 4.

A discrete Fourier transform of the electrical signal of FIG. 4 is illustrated in FIG. 6(a). The resulting two peaks in the spectrum correspond to the frequencies:

$$fp(1)=fo(1)+fd(u1)-fm, \text{ and}$$

$$fp(2)=fo(2)-fd(u2)-fm.$$

In the example illustrated in FIG. 4, the frequency has been reduced by downmixing at a frequency fm. The frequencies fd(u1) and fd(u2) are the Doppler-shift frequencies associated with the velocity components u1 and u2. The sign of each of these two frequencies depends on whether the diffracted beam is at a lower or higher frequency than the primary beam and on the sign convention adopted for the coordinate system. For the multi-frequency signal to be unambiguous, the acousto-optic frequencies fo(1) and fo(2) and the Doppler-shift sensitivities to u1 and u2 must be selected such that for all possible values of u1 and u2, fp(1)>fc(1)>fp(2), where fc(1) is a cut-off frequency which is predetermined. Existing commercially available laser Doppler velocimeter digital frequency processors can be modified to accommodate the spectrum of FIG. 6(a). The discrete Fourier transform produced by the processor, say that of FIG. 6(a), for example, needs only to be broken into the two separate spectra illustrated in FIGS. 6(b) and 6(c), with the first spectra corresponding to the frequency range from fmin to fc(1) and the second spectra other from fc(1) to fmax. (fmax should not be larger than ½ of the sampling frequency in order to avoid alliasing.) For generality, the cut-off frequency fc(1) should be selectable by the user.

Figure 6B:
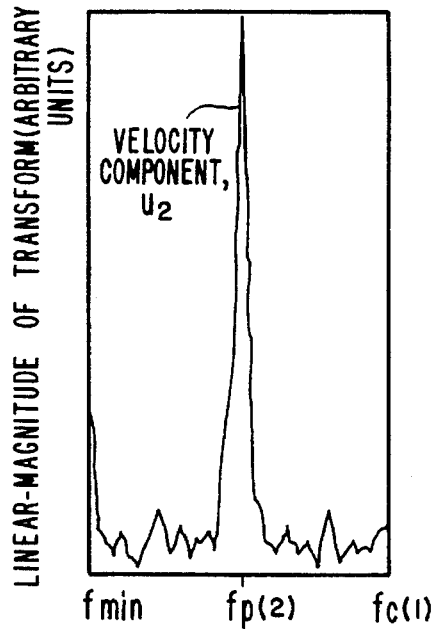
FIGS. 6(b) and 6(c) are divided portions of the Fourier transform of FIG. 6(a)
Figure 6C:
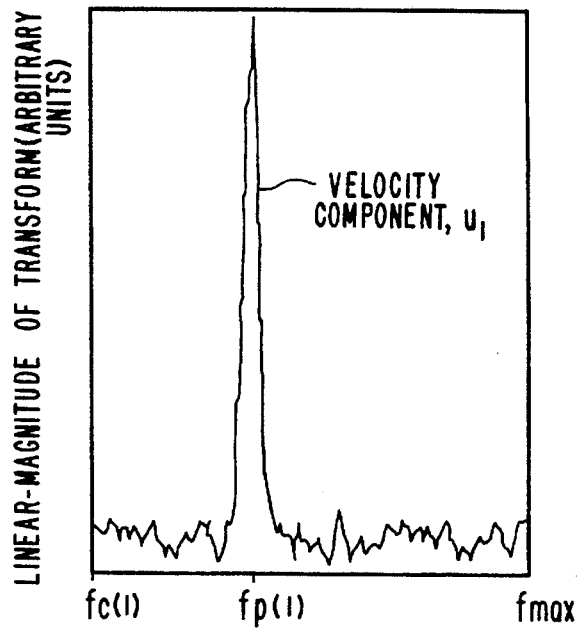

Once the composite spectrum is broken into two parts as shown in FIGS. 6(b) and 6(c), standard procedures adapted in commercial laser Doppler velocimeter digital frequency processors can be applied. For each spectrum, the value of the peak frequency can be determined using the same weighting procedures, and the same signal to noise ratio (SNR) validation criteria can be used. The two spectrums of FIGS. 6(b) and 6(c) can be thought of as coming from two different digital frequency processors running synchronously. The individual spectrums can either be analyzed sequentially or in parallel. Various criteria regarding SNR and signal amplitude can be implemented as if two separate processors were being used. In the case of three velocity components, two cut-off frequencies, fc(1) and fc(2), would be selectable. The original composite spectrum in this case would be broken into three spectra which could then be analyzed individually.

Referring to FIG. 7, the signal processor 42 of the present invention includes an A/D converter 44 which converts the analog electrical signal from the light detector 38 to a digital signal. The digital signal is fed to a discrete Fourier transform generator 46. Thus, the time-domain expression of the signal represented in FIG. 4 is converted to a mathematical equivalent of the same signal in the frequency domain by the generator 46 to yield the Fourier transform illustrated in FIG. 6(a). Optionally, a display 47 can be provided for displaying the transform. A frequency analyzer/separator 48, in the form of a computer with appropriate software, receives the transform data from the generator 46 and identifies and quantifies the two-velocity component peak frequencies. The analyzer/separator 48, based on the input of f(c)1, separates the spectrum into two parts, as illustrated in FIGS. 6(b) and 6(c), which are analyzed individually to determine the peak frequencies for u1 and u2, respectively.

The signals produced by individual particles passing through the sensing volume, as produced by the light detector, are not filtered to separate out the two constituent velocity signals with two processors as is done in the prior art. Instead, the composite signal containing information of the different velocity components is inputted to the same single-channel digital frequency processor. Because a different frequency shift is applied to each velocity channel (as is conventionally done when frequency shifting is used for channel isolation), the different velocity component signals are distinguishable from their location in the frequency spectra.

Numerous modifications and adaptations of the present invention will be apparent to those so skilled in the art and thus, it is intended by the following claims to cover all such modifications and adaptations which fall within the true spirit and scope of the invention.

I claim:

1. A laser doppler velocimeter for measuring multi-velocity component flow of a fluid having seed particles dispersed therein under sparse seeding conditions, comprising:

a laser outputting a beam;

a modulator receiving the laser beam and outputting at least two frequency modulated diffracted beams and a primary beam, each of the at least two diffracted beams corresponding to a velocity component and having a different frequency;

a transmitting lens receiving and converging the at least two frequency modulated diffracted beams and the primary beam to cross at a cross-over region;

a light detector exposed to the collected particle-scattered light and producing a composite electrical signal containing information about each velocity component; and a processor detecting the information in the composite electrical signal in real-time under the sparse seeding conditions as detected information, digitizing the detected information as a digitized electrical signal, and producing a discrete Fourier transform based on the digitized electrical signal, said discrete Fourier transform including a peak frequency corresponding to each velocity component, and said processor processing each velocity component responsive to each peak frequency under the sparse seeding conditions in one channel of the processor, and measuring the multi-velocity component flow.

2. A laser beam doppler velocimeter according to claim 1, further comprising a single-mode optical fiber disposed between the laser and the modulator.

3. A laser beam doppler velocimeter according to claim 1, wherein the modulator is a two-dimensional Bragg cell.

4. A laser beam doppler velocimeter according to claim 3, wherein the Bragg cell is driven at two different frequencies to produce two diffracted beams, each having a different frequency and each corresponding to one of two velocity components, and the primary beam.

5. A laser beam doppler velocimeter according to claim 4, wherein the primary beam and the two diffracted beams define multiple orthogonal planes.

6. A laser beam doppler velocimeter according to claim 1, further comprising a beam waist positioner lens disposed between the laser and the transmitting lens.

7. A laser beam doppler velocimeter according to claim 4, wherein each of the two velocity components lies in a plane of the primary beam and one of the diffracted beams and is perpendicular to a bisector by the corresponding primary beam and diffracted beam.

8. A laser doppler velocimeter according to claim 1, further comprising a multi-mode optic fiber disposed between the light detector and the collection lens, said collection lens focusing collected particle-scattered light into the multi-mode fiber.

9. A method for measuring multi-velocity component flow of a fluid having seed particles dispersed therein under sparse seeding conditions, comprising the steps of:

outputting a laser beam;

modulating the laser beam to produce at least two frequency modulated diffracted beams and a primary beam, each of the at least two diffracted beams corresponding to a velocity component and having a different frequency;

receiving and converging the at least two frequency modulated diffracted beams and the primary beam to cross at a cross-over region;

positioning a collection lens to collect particle-scattered light from the cross-over region;

producing a composite electrical signal with a light detector which receives the collected particle-scattered light, said composite electrical signal containing information about each velocity component;

detecting the information in the composite electrical signal in real-time under the sparse seeding conditions as detected information;

converting the detected information of the composite electrical signal into a digitized electrical signal;

producing a discrete Fourier transform based on the digitized electrical signal with a processor, the discrete Fourier transform including a peak frequency corresponding to each velocity component; and processing each velocity component responsive to each peak frequency of the discrete Fourier transform under the sparse seeding conditions in one channel of the processor, and measuring the multi-velocity component flow.

10. A method according to claim 9, further comprising a single-mode optical fiber disposed between the laser and the modulator.

11. A method according to claim 9, wherein the modulator is a two-dimensional Bragg cell.

12. A method according to claim 11, wherein the Bragg cell is driven at two different frequencies to produce two diffracted beams, each having a different frequency and each corresponding to one of two velocity components, and the primary beam.

13. A method according to claim 12, wherein the primary beam and the two diffracted beams define multiple orthogonal planes.

14. A method according to claim 9, further comprising a beam waist positioner lens disposed between the laser and the transmitting lens.

15. A method according to claim 13, wherein each of the two velocity components lies in a plane of the primary beam and one of the diffracted beams and is perpendicular to a bisector by the corresponding primary beam and diffracted beam.

16. A laser beam doppler velocimeter for performing multi-velocity component measurements under sparse seeding conditions, comprising:

a laser beam emitter and scattered light collection apparatus outputting a composite electrical signal including multi-velocity components occupying different frequency spectra; and processor means for receiving the composite electrical signal from the laser beam emitter and scattered light collection apparatus, for detecting the multi-velocity components in the composite electrical signal in real-time under the sparse seeding conditions as detected information, for digitizing the detected information as a digitized electrical signal, for transforming the digitized electrical signal using a discrete Fourier transform into a frequency signal including different peak frequencies corresponding to the multi-velocity components, and for processing the multi-velocity components responsive to the different peak frequencies under the sparse seeding conditions in one channel of the processor means, measuring the multi-velocity component flow.

17. A laser beam doppler velocimeter according to claim 16, wherein the composite electrical signal is not filtered in the processor means after the multi-velocity components are detected for separate processing of each of the multi-velocity components.

18. A method for performing multi-velocity component measurements using a laser beam doppler velocimeter under sparse seeding conditions, comprising the steps of:

outputting a composite electrical signal including multi-velocity components occupying different frequency spectra;

detecting the multi-velocity components in the composite electrical signal in real-time under the sparse seeding conditions as detected information;

digitizing the detected information as a digitized electrical signal;

transforming the digitized electrical signal using a discrete Fourier transform into a frequency signal including different peak frequencies corresponding to the multi-velocity components; and processing the multi-velocity components responsive to the different peak frequencies under the sparse seeding conditions in one channel of a processor, and measuring the multi-velocity component flow.

19. A method according to claim 18, wherein the composite electrical signal is not filtered after the multi-velocity components are detected for separate processing of each of the multi-velocity components.

* * * * *